Figure 15:
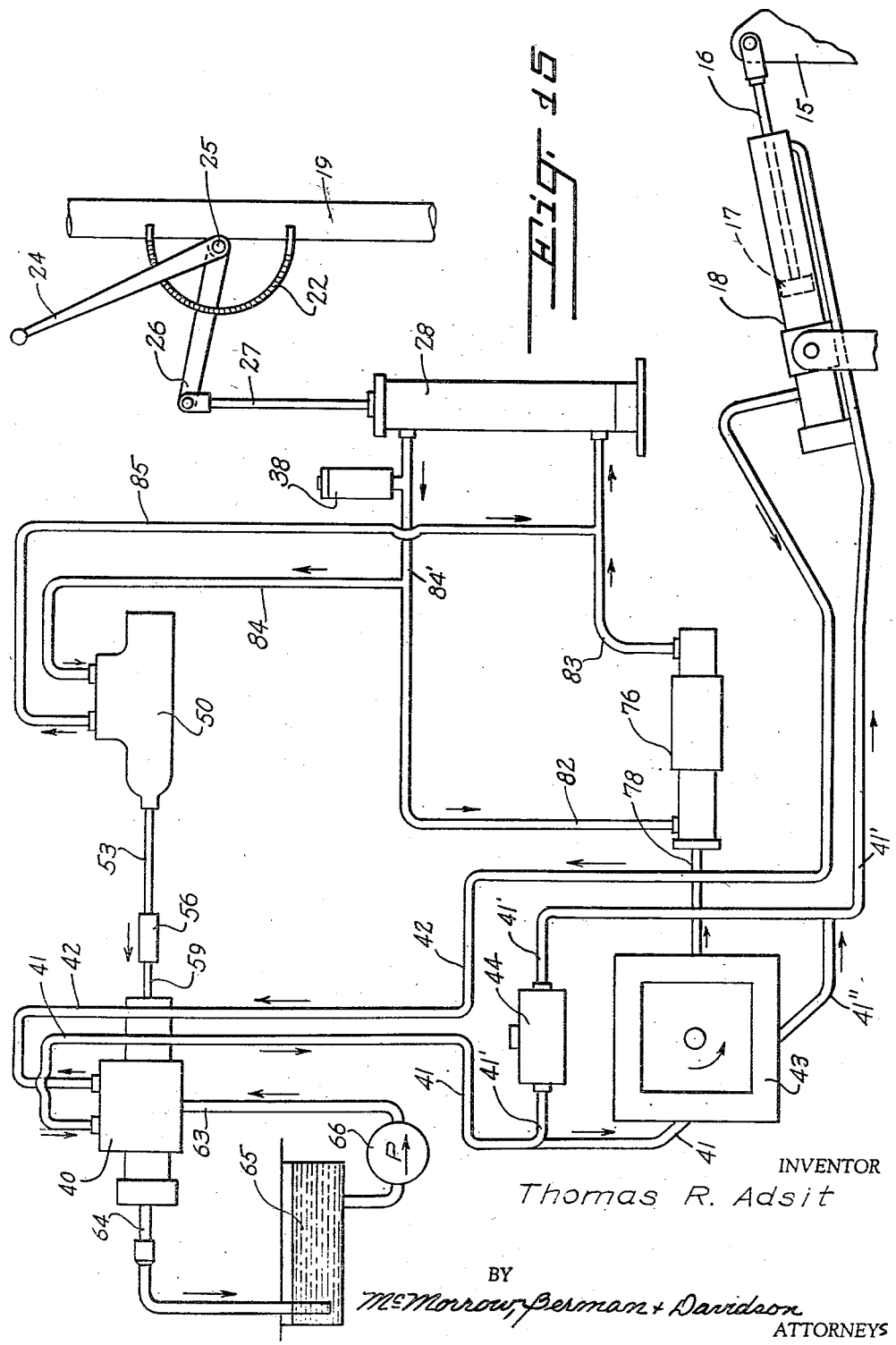

Jan. 28, 1958 T. R. ADSIT 2,821,173
WORK IMPLEMENT POSITION CONTROL HYDRAULIC SYSTEM
Filed Jan. 21, 1955 6 Sheets-Sheet 1
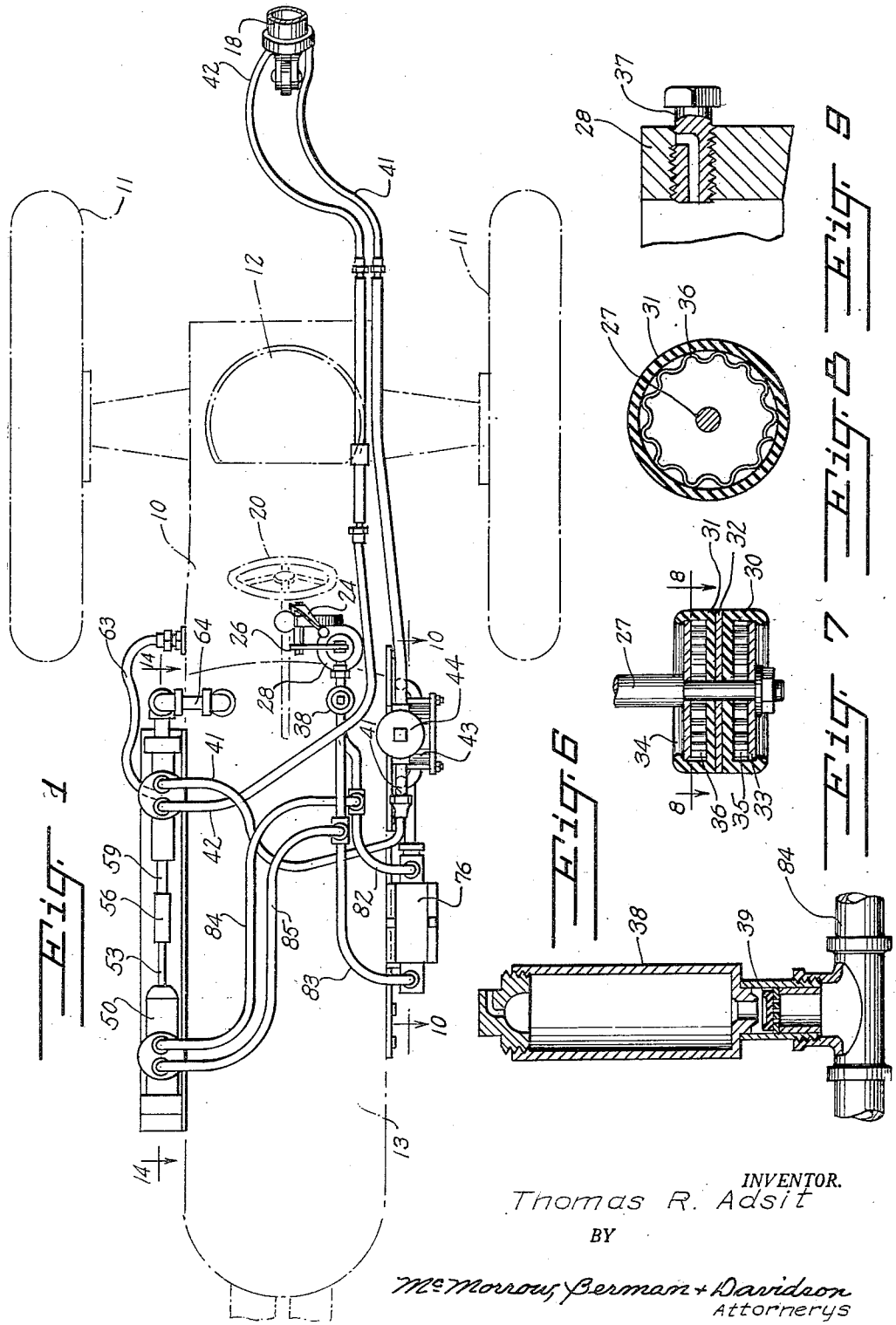
INVENTOR.
Thomas R. Adsit
BY
McMorrow, Berman + Davidson
Attorneys

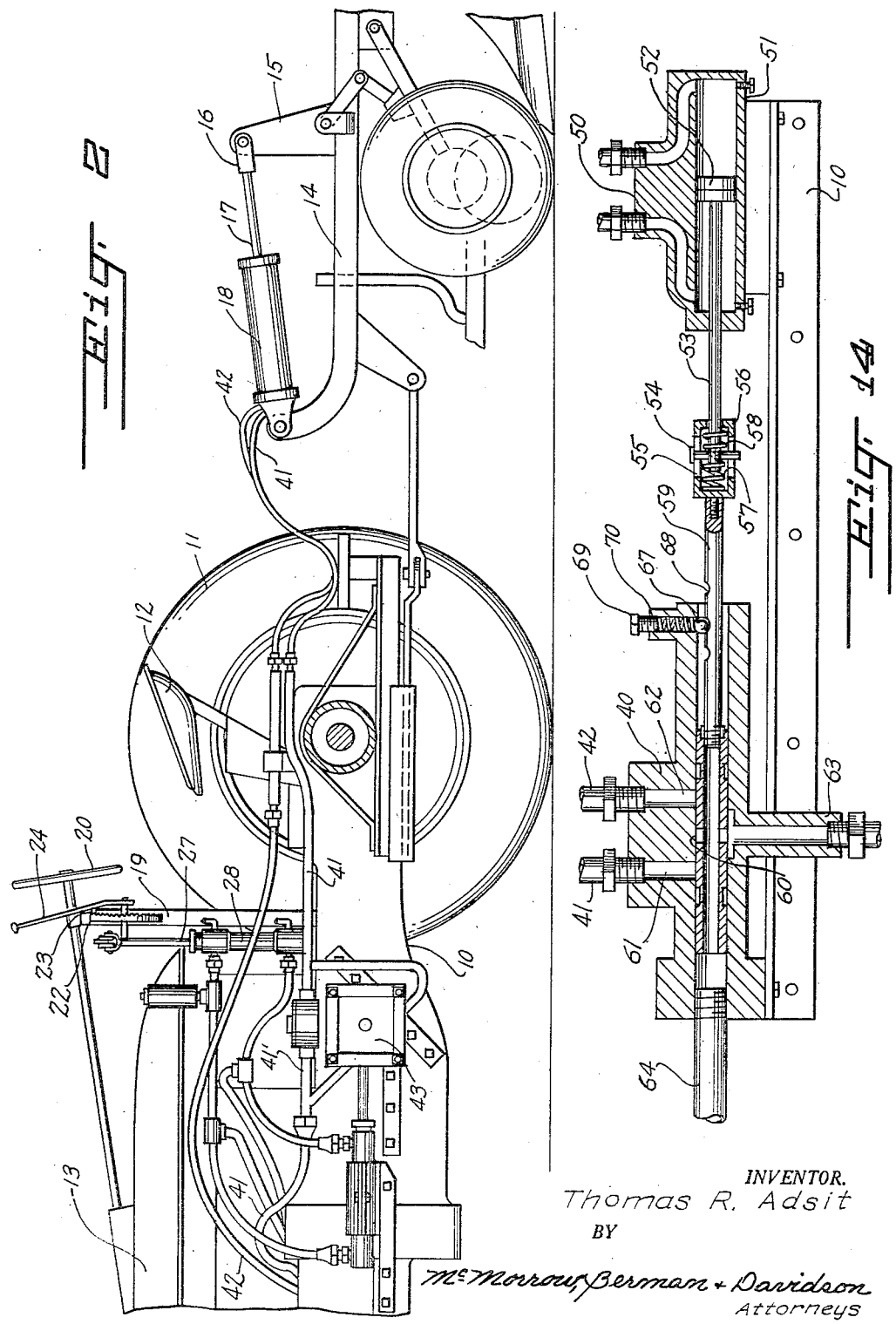

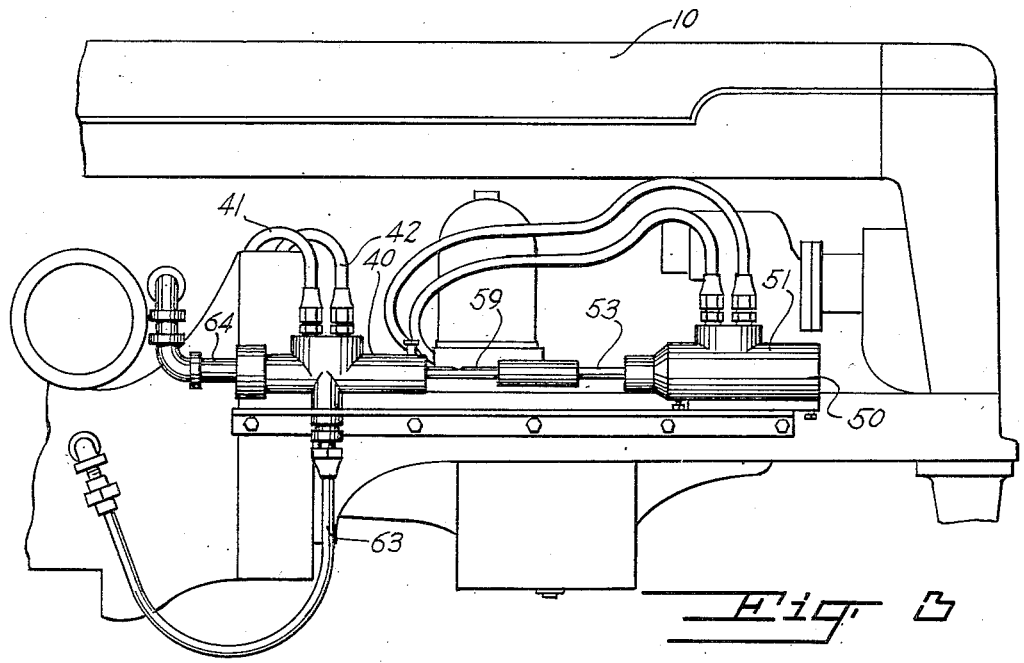
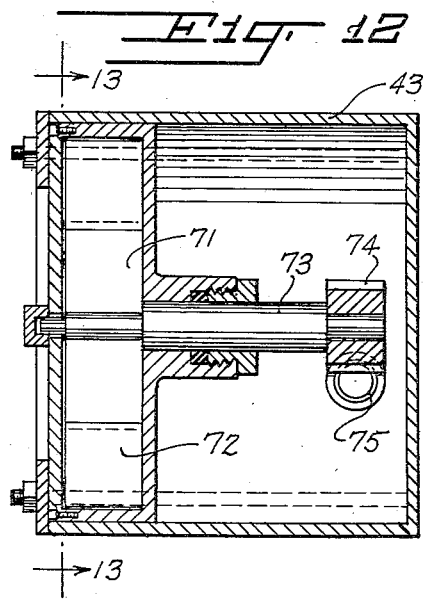
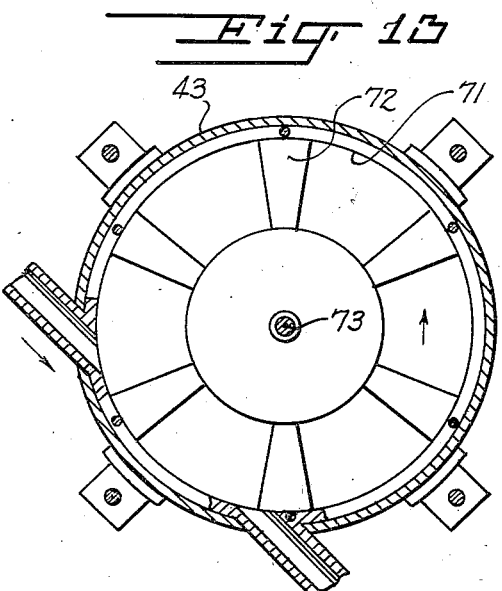

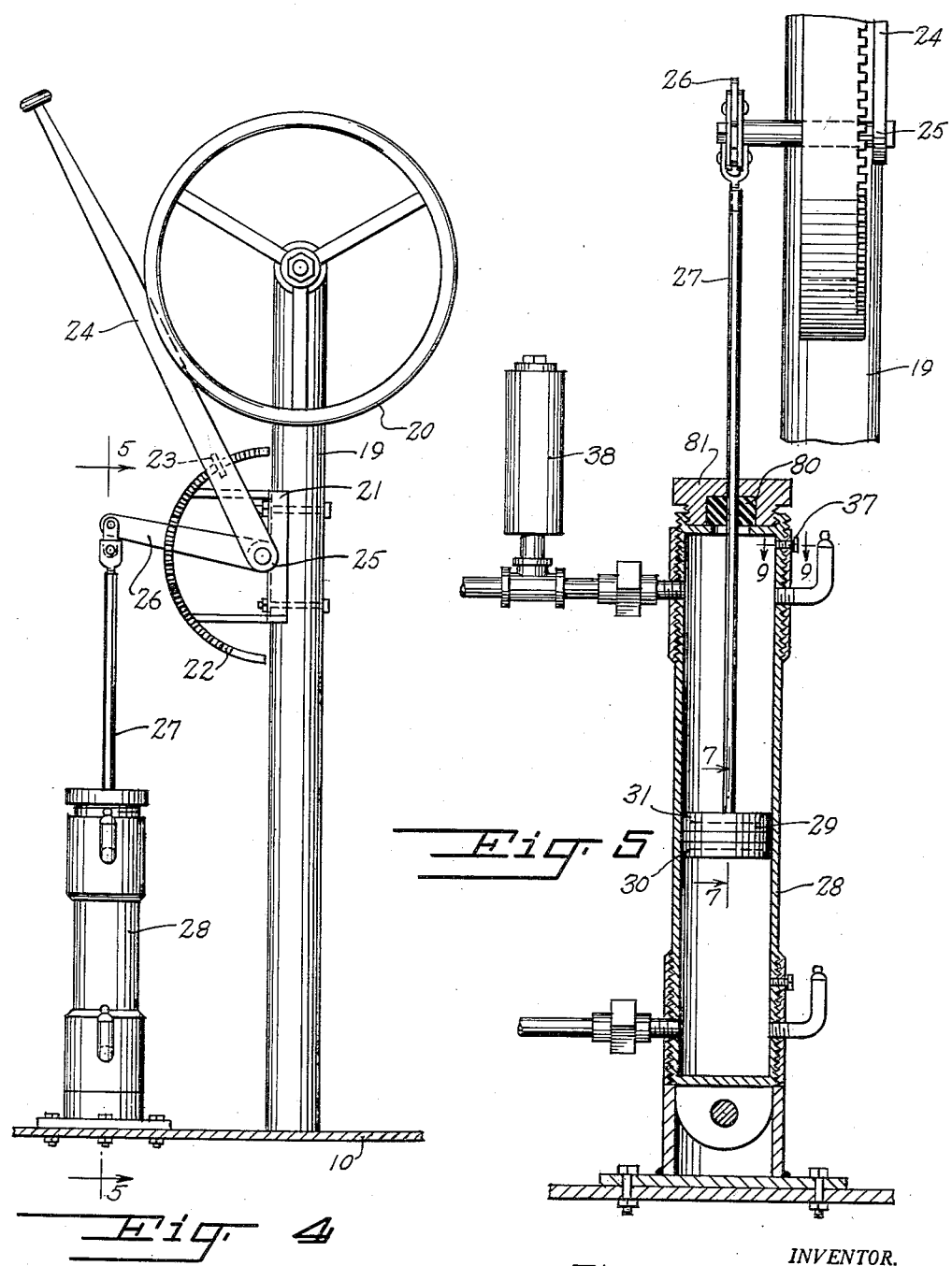

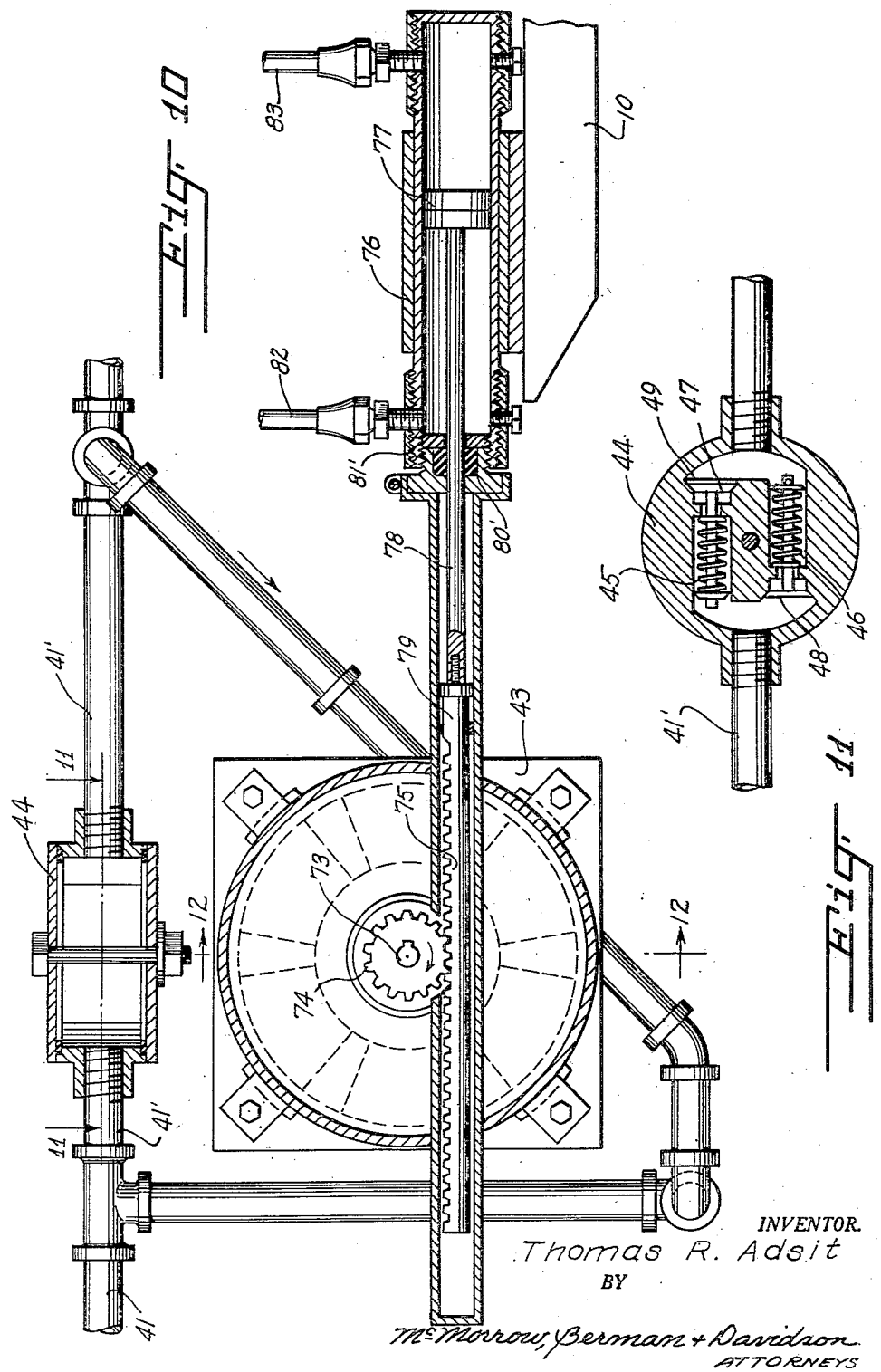

United States Patent Office 2,821,173
Patented Jan. 28, 1958

2,821,173

WORK IMPLEMENT POSITION CONTROL HYDRAULIC SYSTEM

Thomas Ralph Adsit, Kirby, Mont.

Application January 21, 1955, Serial No. 483,231

2 Claims. (Cl. 121—41)

The present invention relates to controls for hydraulic systems on farm implements and the like.

The primary object of the present invention is to provide a fluid operated control for selectively positioning a hydraulic lifting device such as is used on tractors and implements.

Another object of the present invention is to provide a fluid operated control for selectively raising and lowering a hydraulic lifting device and for holding the device between the raised and lowered positions.

A further object of the present invention is to provide a fluid operated control for selectively positioning a hydraulic lifting device and one of sturdy and inexpensive construction, one easily assembled and attached to any common make of tractor having a hydraulic pump.

These and other objects and advantages of the present invention will be fully apparent from the following description when taken in connection with the annexed drawings, in which:

Figure 1 is a vertical view of a preferred arrangement of the components upon a farm tractor, the latter being indicated in dotted lines, Figure 2 is a side view in elevation of certain ones of the components as installed on a tractor and plow, Figure 3 is another view in side elevation of a portion of the tractor as seen on the other side from that shown in Figure 2, and showing the arrangement of the rest of the components, Figure 4 is a view of the control cylinder and the control lever of the present invention as installed on the steering column of the tractor, Figure 5 is a side view in cross-section on line 5—5 of Figure 4, Figure 6 is a side view in cross-section of one of the components of the present invention, Figure 7 is a partial side view in cross-section on line 7—7 of Figure 5, Figure 8 is a vertical view in cross-section on line 8—8 of Figure 1, Figure 9 is a vertical view in cross-section on line 9—9 of Figure 5, Figure 10 is a side view partially in cross-section on line 10—10 of Figure 1, Figure 11 is a vertical view in cross-section on line 11—11 of Figure 10, Figure 12 is an end view in cross-section on line 12—12 of Figure 10, Figure 13 is a side view in cross-section on line 13—13 of Figure 12, Figure 14 is a side view in cross-section on line 14—14 of Figure 1, and Figure 15 is a schematic view of the components of the present invention showing by arrows the flow of the hydraulic fluid in the hydraulic system in a condition in which the operating arm of the implement is being raised, the components being arranged in the schematic view without regard to their respective positions in the preceding views.

Referring in greater detail to the drawings in which like numerals indicate like parts throughout the several views, in Figure 1, a tractor is shown in dotted lines as indicated by the reference numeral 10, and is seen to have wheels 11, a seat 12, and a body or engine portion 13.

In Figure 2 a plow 14 is shown in towing position attached to the tractor 10, although any other implement may be similarly arranged. The plow 14 has an operating arm 15, the upper end of which is attached to one end of the drive piston rod 16 at the free end of the latter. The other end of the piston rod 16 is connected to a piston indicated in dotted lines in Figure 15 at 17, the piston rod 16 extending by its free end from a closed drive cylinder 18.

Referring to Figures 1, 2, 4, 5, and 15, a steering column 19 is carried by the engine portion 13 of the tractor 10 and has the steering wheel 20 at its upper end. Also carried on the column 19 is a bracket 21 carrying a notched segment 22 against which bears the lug 23 which is carried by an arm 24 intermediate the ends thereof, the lug 23 holding the arm 24 in any selected adjusted position on the segment 22. One end of the arm 24 is secured to a rotatable pin 25 carried by the column 19, the other end of the arm 24 having a knob for application of a hand of an operator thereto. Another arm 26 has one end secured to the pin 25, and has the other end pivotally connected to the upper end of a control piston rod 27 which projects from the upper end of a closed control cylinder 28.

Referring to Figures 5, 7, 8, 9, and 15, the other end of the control piston rod 27 is secured to a control piston 29 slidably positioned within the control cylinder 28. The piston 29 is formed from oil resisting neoprene washers 30 and 31 separated by a steel washer 32 held in position by the other steel washers 33 and 34, respectively, and the expansion springs 35 and 36, respectively, as seen in detail in Figures 7 and 8.

An air bleed valve 37, shown in detail in Figure 9, is provided to bleed air from the upper end of the control cylinder 28.

Referring to Figures 5, 6 and 15, an oil reservoir 38 is provided for the control cylinder 28 and has a valve 39 preventing the escape of the oil upwardly, although permitting automatic refilling action should any of the control fluid be lost from the cylinder 28 or its associated conduits.

Again referring to Figures 1 and 3, the engine portion 13 of the tractor 10 carries on one of its sides a control valve 40 connected by conduits 41 and 42 to the drive cylinder 18, the former conduit 41 extending first to a reversible fluid motor 43, seen in side elevational view in Figure 2, and in detailed view in Figures 10, 12, and 13.

A by-pass 44 is connected by a conduit 41' around the reversible fluid motor 43, as seen in Figures 1, 2, 10, and 15. The details of construction, as seen in Figure 11, include a pair of opposed springs 45 and 46 with the opposed valves 47 and 48 within a casing 49.

The springs 45 and 46 are loaded at approximately 80 pounds oil pressure and permit passage of the drive oil from the control valve 40 to the drive cylinder 18, according to the direction of flow, whenever the fluid motor 43 has moved to its limit in either direction, as will be explained later.

Referring to Figures 1, 3, 14, and 15, the control valve 40 is seen to be drivably connected to another reversible fluid motor 50, embodying a closed cylinder 51 mounted like the valve 40 on the tractor frame and having a piston 52 connected to one end of an actuator rod 53, the other end of which projects out of one end of the cylinder 51 and is connected to a pin 54 slidable in a slot 55 formed in opposite sides of a sleeve 56.

Within the sleeve 56 are a pair of springs, one on each side of the pin 54, the sleeves providing a resilient connection of the actuator rod 53 to the free end of a valve stem 59.

The valve stem 59 extends outwardly from one end of the control valve 40 and is provided inwardly of its other end with a distributing port 60 selectively connectible with either a port 61 or a port 62 in the valve 40. The port 61 is connected in communication with the conduit 41 and the port 62 is connected in communication with the conduit 42. The valve stem 59 is hollow and fluid is supplied to the distributing port 60 by a high pressure supply conduit 63, the return conduit 64 of the valve 40 connecting the interior of the valve stem 59 with the tractor fluid reservoir 65, with suitable relief valves (not shown) in the conduit 64 for maintaining high fluid pressure in the valve stem 59.

The high pressure supply conduit 63 is connected to the hydraulic fluid pump of the tractor, also within the tractor and not shown but indicated in Figure 15 by the reference numeral 66.

The casing of the valve 40 is provided with a spring biased ball 67 which seats itself in any one of three detent recesses 68 to position the valve stem in up, neutral, or down positions, the position of neutral being shown in Figure 14.

The pressure of the ball 67 in a selected one of the recesses 68 is made adjustable by a bolt 69 in order to give a delayed snap and over center action to the valve 40 in response to movement in either direction of the actuator rod 53, the springs 57 and 58 within the sleeve 56 absorbing the movement of the rod 53 until the spring 70 is compressed sufficiently to release the ball 67 from its position in one of the recesses.

Referring in more detail to Figures 10, 12, and 13, the fluid motor 43 has a circular casing attached to the tractor by means of a square frame and is formed with a vane chamber 71 in which rotate vanes 72 secured to a shaft 73, the latter carrying the pinion gear 74 in meshing engagement with a rack 75.

A closed decontrol cylinder 76 is provided and has a piston 77 slidable within and connected to one end of a piston rod 78, the other end of which is connected to the bar 79 carrying the rack 75.

The control and decontrol cylinders 28 and 76, respectively, are provided with suitable packing 80 and 80', and gland nuts 81 and 81', respectively, and seen in detail in Figures 5 and 10.

Conduits 82 and 83 connect the ends of the decontrol cylinder to the conduits 84 and 85, respectively, the latter of which also connect with the upper and lower ends of the control cylinder 28, respectively.

The use and operation of the present invention is as follows:

Presently in use are tractors having hydraulic systems for raising and lowering implements and having control levers located near the operator's seat by means of which the operator controls the hydraulic system. The controls thus provided, are usually shiftable between positions of up and down and have no stops to limit the upward and downward position.

In most hydraulic systems, stops limiting the upwardly or downwardly movement of the implement are provided upon the implement itself, necessitating the operator leaving his seat and adjusting the stops on the implement.

Further, when the control of the hydraulic system is operated by the lever provided on present day tractors and the tractors are of the high-speed type, the operator finds it difficult to adjust the height of the implement by watching it raise or lower and at the same time keep the tractor driving in a straight line on the field.

The present invention permits the operator to set the height of the plow or other implement without turning around to watch it. To do this, the operator moves the arm 24 along the segment 22 to a selected position, for instance, a position upwardly of a central position. This movement results in partial clockwise rotation of the pin 25, upward movement of the arm 26, and elevation of the piston rod 27 and piston 29 carried thereby. With the elevation of the piston in the control cylinder 28 the fluid is forced out of the cylinder 28 through the conduits 84' and 84 into one end of the fluid motor 50, causing the piston 52 to move the actuator rod 53 toward the valve 40 and to compress the spring 57 within the sleeve 56. When the spring 57 has been compressed enough to overcome the restraint of movement of the ball 67 out of the center recess 68 due to the pressure of the spring 70, the valve stem 59 is moved by the actuating rod 53 to a position into which the distributing port 60 is in registry with the port 61 and permits fluid to flow under pressure from the pump 66 through the conduit 41 to the motor 43 and thence through conduits 41" and 41' to one end of the drive cylinder 18 on one side of the piston 17, resulting in the piston rod 16 moving the operating arm 15 toward the cylinder 18. The thus described flow of fluid is indicated by arrows in Figure 15. As fluid flows through the motor 43 it affects the rotation of the vanes 72 and the shaft 73 carrying the vanes, resulting in corresponding rotation of the pinion gear 74 and sliding movement of the rack 75, and movement of the piston 77 within the cylinder 76. Movement of the piston 77 in the cylinder 76 forces fluid out of the cylinder 76 through the conduits 83 and 85 and into the other end of the motor 50, causing the return movement of the piston 52 and movement of the valve stem 59 to the position in which the port 61 is out of registry with the conduit 41 and closing off the flow of fluid to the cylinder 18 and stopping the movement of the arm 15. The piston 77 is now at the limit of its movement in one direction or against the closed end of the cylinder 76 and remains in this position by virtue of the meshing engagement of the pinion 75 with the rack 75.

By shifting the arm 24 along the segment 22 to any position closer to the central position or on the other side of the central position, the pin 25 is partially rotated in a counterclockwise direction and the arm 26 is moved downwardly. This results in the lowering of the piston rod 27 and the piston 29 carried thereby. Upon downward movement of the piston 29 in the control cylinder 28, the fluid is forced out of the lower end of the cylinder 28 through the conduit 85 into the other end of the fluid motor 50, causing the piston 52 to move the actuator rod 53 in the direction away from the valve 40 and to compress the spring 58 within the sleeve 56. When the spring 58 has been compressed enough to overcome the restraint of movement of the ball 67 out of the recess 68, the valve stem 59 is shifted to a position in which the distributing port 60 is in registry with the port 62 and permits fluid to flow under pressure from the pump 66 through the conduit 42 to the other end of the drive cylinder 18, resulting in the piston rod 16 moving the operatnig arm 15 away from the cylinder 18. As the fluid flows from the opposite end of the cylinder 18 it flows through conduits 41', 41", and through the motor 43, effecting rotation of the vanes 72 on the shaft 73 in the reverse direction and resulting in corresponding rotation of the pinion gear 74 and sliding movement of the rack 75 and movement of the piston 77 within the cylinder 76. This movement of the piston 77 forces fluid out of the cylinder 76 through the conduit 82 and into the end of the motor 50, causing the movement of the piston 52 and the corresponding movement of the valve stem 59 to the position in which the port 62 is out of registry with the conduit 42 and again closing off flow of fluid to the cylinder 18 and stopping the movement of the arm 15.

Should it be desired to move the operating arm 15 either closer to or further away from the cylinder 18 from either of the previously described selected positions with the piston 77 maintained against the respective closed end of the cylinder 76 by virtue of the pinion 74 in meshing engagement with the rack 75, the arm 24 may be moved to a corresponding position still further removed from the central position along the segment 22. This additional movement of the arm 24 causes the pin 25 to be rotated and effects the further movement of the arm 26 with corresponding movement of the piston rod 27 and the piston 29 carried by the piston rod 27 within the cylinder 28. Fluid is again forced through one or the other of the conduits 84, 85 to the motor 50, resulting in the movement of the piston 52 and movement of the actuator rod 53 to compress the respective spring 57 or 58, resulting in the snap action movement of the valve stem 59 to a position in which the distributing port 60 is in registry with either port 61 or port 62, again permitting fluid under high pressure to flow either through conduts 41, 41', through the by-pass 44, and to one end of the drive cylinder 18, or through the conduit 42 to the other end of the drive cylinder 42, resulting in corresponding movement of the arm 15.

What is claimed is:

1. In a hydraulic system for selectively effecting movement of a working element, a closed drive cylinder having a reciprocating drive piston, a drive piston rod having one end secured to said drive piston and having the other end exteriorly of one of the ends of said drive cylinder, means on the other end of said drive piston rod for attachment to a working element, a closed control cylinder having a reciprocating control piston, a control piston rod having one end secured to said control piston and having the other end exteriorly of one of the ends of said control cylinder, an arm having one end secured to a rotatable pin adapted to be carried by a steering column, another arm having one end secured to said pin and having the other end pivotally connected to the other end of said control piston rod, said another arm having means selectively engageable with means adapted to be connected to said steering column, a control valve connected in fluid communication with said drive cylinder on one side of said drive piston, a first reversible fluid motor connected in fluid communication with said control cylinder on one side of said control piston and mechanically connected to said control valve, said first fluid motor being operable in response to movement of said control piston in said control cylinder in one direction to admit driving fluid to said drive cylinder on one side of said drive piston and in response to movement of said control piston in the other direction to admit driving fluid to said drive cylinder on the other side of said drive piston, a decontrol cylinder having a reciprocal decontrol piston, a decontrol piston rod having one end secured to said decontrol piston and having the other end exteriorly of one of the ends of said decontrol cylinder, conduit means connecting said one end of said decontrol cylinder to the first fluid motor on one side thereof and the other end of said decontrol cylinder to the other side of said first fluid motor, a second reversible fluid motor connected in fluid communication with said drive cylinder on the other side of said drive piston and mechanically connected to the other end of said decontrol piston rod, said second fluid motor being operable in response to execution of fluid flow into said drive cylinder on one side of said drive piston to energize said first fluid motor to cut off admission of fluid into said drive cylinder on said one side of said drive piston and in response to execution of fluid flow into said drive cylinder on the other side of said drive piston to stop admission of fluid to said other side of said drive piston, and delay means operatively connected to said first fluid motor and to said control valve for causing sequential operation of said first and second fluid motors, said delay means embodying a spring biased over center connection element having one end operatively connected to said control valve and the other end operatively connected to said first fluid motor.

2. A hydraulic system for selectively effecting movement of a working element, comprising a closed drive cylinder having a reciprocating drive piston, a drive piston rod having one end secured to said drive piston and having the other end exteriorly of one of the ends of said drive cylinder, means on the other end of said drive piston rod for attachment to a working element, a closed control cylinder having a reciprocating control piston, a control piston rod having one end secured to said control piston and having the other end exteriorly of one of the ends of said control cylinder, an arm having one end secured to a rotatable pin adapted to be carried by a steering column, another arm having one end secured to said pin and having the other end pivotally connected to said other end of said control piston rod, said another arm having means selectively engageable with means adapted to be connected to said steering column, a control valve connected in fluid communication with said drive cylinder on one side of said drive piston, a first reversible fluid motor connected in fluid communication with said control cylinder on one side of said control piston and mechanically connected to said control valve, said first fluid motor being operable in response to movement of said control piston in said control cylinder in one direction to admit driving fluid to said drive cylinder on one side of said drive piston and in response to movement of said control piston in the other direction to admit driving fluid to said drive cylinder on the other side of said drive piston, a closed decontrol cylinder mechanically connected to said reversible fluid motor and connected in fluid communication with said control cylinder on the other side of said control piston, a second reversible fluid motor connected in fluid communication with said drive cylinder on one side of said drive piston and mechanically connected to the other end of said decontrol piston rod, said second fluid motor being operable in response to execution of fluid flow into said drive cylinder on one side of said drive piston to energize said first fluid motor to cut off admission of fluid into said drive cylinder on said one side of said drive piston and in response to execution of fluid flow into said drive cylinder on the other side of said drive piston to stop admission of fluid to said other side of said drive piston, delay means operatively connected to said first fluid motor and to said control valve for causing sequential operation of said first and second fluid motors, said means embodying a spring biased over center connection element having one end operatively connected to said control valve and the other end operatively connected to said first fluid motor.

References Cited in the file of this patent

UNITED STATES PATENTS

| | | |
|---|---|---|
| 752,491 | Warren | Feb. 16, 1904 |
| 897,907 | Lang | Sept. 8, 1908 |
| 2,172,315 | Blasig | Sept. 5, 1939 |
| 2,448,465 | Rockwell | Aug. 31, 1948 |
| 2,506,093 | Macduff | May 2, 1950 |
| 2,524,055 | Hubert | Oct. 3, 1950 |
| 2,631,795 | Schultz | Mar. 17, 1953 |

FOREIGN PATENTS

| | | |
|---|---|---|
| 241,048 | Germany | Nov. 24, 1911 |
| 702,983 | Germany | Feb. 25, 1941 |